No. 726,167. PATENTED APR. 21, 1903.
W. H. JOHNSON.
WATER BOILER, SKIMMER, AND OIL SEPARATOR.
APPLICATION FILED JUNE 27, 1902.
NO MODEL.
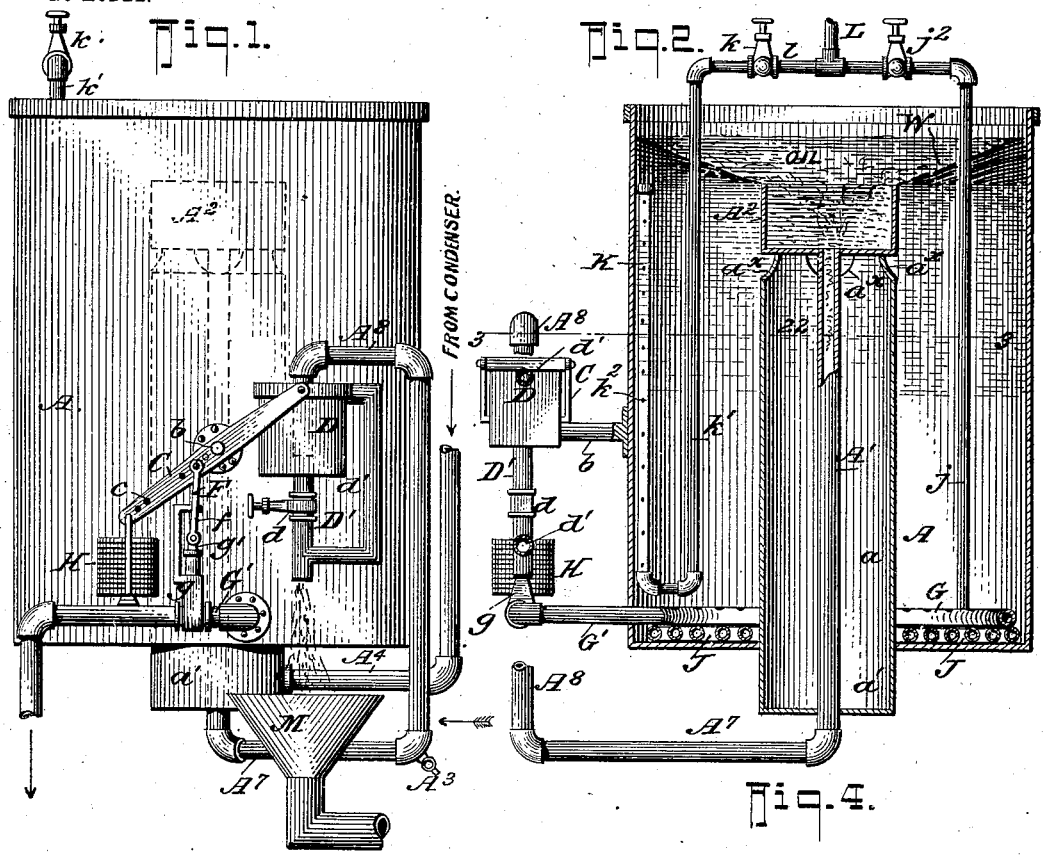
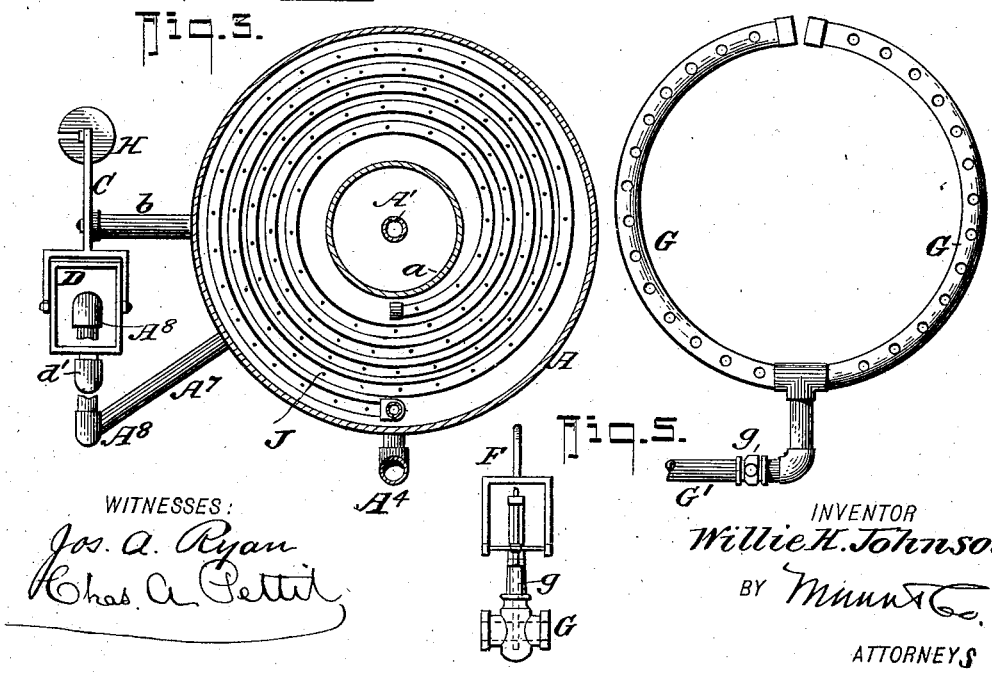
WITNESSES:
Jos. A. Ryan
Chas. A. Pettit
INVENTOR
Willie H. Johnson.
BY Munn & Co.
ATTORNEYS

UNITED STATES PATENT OFFICE.

WILLIE HARRY JOHNSON, OF WACO, TEXAS.

WATER-BOILER, SKIMMER, AND OIL-SEPARATOR.

SPECIFICATION forming part of Letters Patent No. 726,167, dated April 21, 1903.

Application filed June 27, 1902. Serial No. 113,473. (No model.)

*To all whom it may concern:*

Be it known that I, WILLIE HARRY JOHNSON, residing at Waco, in the county of McLennan and State of Texas, have invented a new and Improved Water-Boiler, Skimmer, and Oil-Separator, of which the following is a specification.

My invention is in the nature of a new and improved means for automatically skimming and separating oil and other impurities from steam condensations and for reboiling the impure waters, so as to separate the oil and other impurities therefrom, whereby to render said waters pure and clear, and especially adapted for making artificial ice.

Generically my invention comprehends a novel arrangement of parts for effectively separating the oil and other impurities contained in the water, especially that resultant from exhaust-steam, and simultaneously reboiling the impure water, skimming it, and discharging the same in its reboiled state in proportion to the condensed fluid that is fed into the reboiling-tank less the oil and other impurities, (skimmings.)

In its more complete nature my invention comprises a receiving-tank into which the water from the condensers is fed, a means for creating a centrifugal or whirling action of the water, whereby to force the oil and other floatable impurities toward the water-surface in a concaved condition, and a means within the receiving-tank and in communication with its water-space for collecting the skimmings at the water-surface and for discharging the same outside of the tank.

Again, my invention includes, in connection with the aforesaid separating means, regulating devices for controlling the discharge of the purified water in proportion to the amount of condensed water mixed with oil and other impurities less the separations, governed by the passage of said separations or skimmings from the tank; and in its more subordinate features this invention consists in certain novel details of construction and peculiar combination of parts, all of which will be hereinafter fully described, and specifically pointed out in the appended claims, reference being had to the accompanying drawings, in which—

Figure 1 is a side elevation of my invention. Fig. 2 is a central sectional view of the receiving-tank with the separating means contained therein, the controlling-valve devices connected with the main tank being shown in side elevation and viewed from the direction indicated by the arrow in Fig. 1. Fig. 3 is a horizontal section of the same on the line 3 3 of Fig. 2. Fig. 4 is a plan view of the offtake-pipes and the controlling-valve. Fig. 5 is a detail view of the said valve, with the shifting yoke hereinafter referred to.

In the practical application of my invention the same is suitably supported to receive the water from a steam condenser or condensers, and when in a plane below the condenser the condensed water gravitates into the main tank; but when the said tank is in a plane above the said condenser the water therefrom may be pumped into the main tank in any approved manner.

In the drawings, A designates a main tank of suitable dimensions, and within the said tank and centrally thereof is a vertical tube $a$, the lower end of which extends below the bottom of the tank A, and with the extension $a'$ of the said tube $a$ connects a feed-pipe $a^4$, that joins with the condenser. (Not shown.) The tube $a$ extends up near the upper end of the tank A, and upon the upper end of said tube $a$ is mounted a collector or skimming-pan $A^2$, with which the offtake-pipe $A'$ connects and which extends down through the bottom of the tube $a$ and joins with the automatically-operating valve-controlling mechanism, as clearly shown in Fig. 1, the reasons for which will presently appear. At a point under the pan $A^2$ the tube $a$ has outlets $a^\times$ for the passage of the water into the outer or reboiler tank A. By entering the water into the tank A, as stated, it is heated as it rises in the central tube $a$ before it enters the outer tank A, and by reason thereof the oil and other impurities lighter than water are the more effectively carried up to the skimming or separating point and said oil or other impurities drawn by gravity toward the center of the tank A and over the skimming-pan $A^2$ as the pure water settles down to the bottom of the tank A, from whence it is drawn out through the semicircular offtake-pipes G, which empty into a single discharge-pipe G', in which is mounted a throttle-valve $g$, automatically shiftable at predetermined times in a manner presently explained.

To cause the water to bank up against the sides or periphery of the tank A, whereby to concave the water-surface and increase the gravitation of the oil and other floatable impurities toward the skimming-pan, I provide a live-steam-supply pipe L, having a lateral $l$, equipped with a valve $k$ and with a pendent member $k'$, that extends down in the tank to near the bottom thereof and terminates with a spray or ejector member K, disposed near the inner edge of the tank (see Fig. 2) and having its perforations $k^2$ positioned to discharge the steam in a tangential direction—that is, against the outer or peripheral edge of the water bulk—whereby to create a whirling action of the water within the tank and depress itself in the center, as indicated in Fig. 2, and as oil and water do not mix well, especially when hot, and the oil being a much lighter substance than the water the said oil, together with other floatable impurities contained within the water that is fed into the tank from the condenser, is forced to the top or concaved surface W of the water, and by reason of such concaved surface the oil is drawn by gravity into the skimming pan $A^2$, and as such movement of the oil and other impurities goes on the skimmed water, which is the heaviest substance, is thrown outwardly by centrifugal force and settles down upon and discharges through the perforated offtake-pipes G. The steam from pipe L, it will be noticed, (see Fig. 2,) enters the ejector-pipe K at its lowest extremity. This arrangement is provided for the reason that the water-pressure is greater at the lower end of pipe K than at its upper end, as the water that stands in the submerged pipe K has its greatest pressure at the lowest point, and the steam is thereby caused to enter at the point where it meets its greatest resistance, and hence when the same is fed into the pipe K it will rise up in said pipe and pass out through all of the discharge-orifices in the pipe K under a uniform pressure. The steam cannot rise until it displaces in the lower extremities of the pipe K and cannot flow out of the bottom holes without flowing out of the top holes in the said pipe K.

So far as described it will be readily apparent that as the condensed water enters the inner tube $a$ and rises to the top of the skimming-surface it is whirled centrifugally to create a concaved surface leading toward the skimming or collecting pan, into which the lighter articles are precipitated and from whence they escape into the offtake-pipe A'.

To reboil the clear water at the bottom of tank A, a spiral perforated pipe-coil J is mounted upon the bottom of the said tank, which has a feed-pipe $j$, connected by a lateral having a valve $j^2$, that connects with the live-steam pipe L. The skimmings that pass down through the pipe A' strike the water-level on the line 22, (see Fig. 2,) and from the pipe A' they pass into the pipe-section $A^7$ and from thence through the lateral $A^8$ and discharge into a bucket D. The water-line 22 in the inner tube $a$ is on the level of bucket D when the latter is at its highest altitude, and the said bucket and pipe-section $A^8$ of necessity are below the skimming-pan $A^2$. The pipe-section $A^7$ has a drain-cock $A^3$ for ordinary purposes. The bucket D has an outlet-pipe D' in the bottom with which connects an overflow-pipe $d'$, joined with the upper end of the bucket, as shown, and the said pipe D' has a valve $d$, which under ordinary conditions is but partially open, so that the skimmings that are discharged into the bucket D will accumulate faster within the said bucket than they run out of the same through the valve $d$, the discharge from which passes out through the waste-funnel M, as shown. As the skimmings accumulate in the bucket D the same finally becomes sufficiently weighted and acts as a counterpoise against and lifts the weights H, which are attached to one end of the lever C, fulcrumed at $b$, on the other end of which is pivotally hung the bucket D. To the weighted end of the lever C is pivotally connected the yoke F, the ends $f$ of which join with the valve-rod $g'$, of the throttle or gate valve $g$, (see Fig. 5,) and serves to open the said valve to allow the skimmed, cleared, and reboiled water in the tank A to run out to a cooler or to any other desired point.

When the skimmed water begins to run out through the valve $g$, the skimming process in the tank decreases, and as fast as the skimmings run into the bucket by reason of the decreased quantity of skimmings the said skimmings will run out through the valve $d$ into the waste-funnel M, and hence the weight of the bucket D decreases until it and the weight H counterbalance, when the valve $g$ will be held partly open, and as soon as the water is drawn too fast through the valve $g$ the skimming decreases, and the skimmings then run into the bucket D slower than they run out through the valve $g$, and thereby make the bucket D sufficiently lighter than the weights H to permit of the said weights H shifting the lever C to automatically reduce the open position of the valve $g$ until the water or skimmings that accumulate in the bucket D can equal the weight of the counterpoise H. When the water in the tank is drawn so fast through the valve $g$ as to bring the water in the tank below the skimming-line, the throttle-valve will close automatically and remain so until enough skimmings can accumulate in the bucket D to outweight the poise H, when the said weight will again shift and open the valve $g$ enough to automatically cause the skimmings to run into the bucket as fast as the regulating-valve permits it to run out into the waste-funnel M.

To skim off a greater amount of the condensed water, the valve $d$ is opened more, and to skim a lesser amount the said valve $d$ is adjusted to a further closed position. When the valve $d$ is open to its limit, no skimmings can assemble in the bucket D to lift the weight H, and the valve $g$ remains closed until the valve $d$ is again adjusted to a nearly-closed position to permit a sufficient accumulation of water in the bucket D to again open the valve $g$.

During the operation of my apparatus the condensed water must be continuously running into the tank A. The lever C has a series of holes $c$ for supporting the weights H in a manner to increase or decrease their leverage power at will. The overflow-pipe $d'$ is provided, so that when the offtake-pipe G is cut out without the throttle-valve $g$ discharging the fluid therethrough and the condensations continue to run into the tank A and flow into bucket D, which then becomes excessive and cannot pass out through the partly-open valve $d$, it will then partly pass out through the overflow $d'$ into the waste-drainage M.

By placing the tube $a$ in the center of the tank A said tube does not impede the whirling action of the water in the tank A. The two semicircular pipes G have their perforations sufficiently large so as not to clog up, and by arranging said pipes as shown the skimmed or purified water will be received therein all around the periphery of the bottom of the tank A.

It should be stated the object of the live-steam coil J is not to make the pure water at the bottom of the tank more pure, but to prevent the settling down of the impure water above as the heat rises and heats the inner tube $a$ or the impure water as it rises in it, and the perforated live-steam pipe K not only causes the water to whirl, but heats it around the periphery of the tank, where the pure water is thrown outwardly by centrifugal force. The outlet of the offtake-pipe $A^8$ extends down into the bucket D at a point near its bottom, so when the bucket D is at its lowest point the skimmings from offtake $A^8$ $A^7$ will not be blown by wind over the edges of the bucket D. The mouth or outlet of the offtake $A^8$ will be so near the top of bucket D that nothing will deflect its straight downward flow into said bucket.

From the foregoing description, taken in connection with the accompanying drawings, it is thought the complete operation and advantages of my invention will be readily understood. It is obvious that changes in the details and modifications thereof may be made without departing from my invention or the scope of the appended claims.

Having thus described my invention, what I claim, and desire to secure by Letters Patent, is—

1. An apparatus for the purposes described, comprising a vessel for receiving the fluid to be separated, an offtake extended into the vessel to a point below its upper end, and terminating in the central collecting-pan, and means for whirling the water within the receiving vessel, whereby to precipitate the floatable particles toward the collecting-pan, as set forth.

2. In an apparatus as described, an outer receiving-tank, a feed-tube extending centrally into the tank, a collecting-pan surmounting the tube, the latter having outlets communicating with the receiving-tank, an offtake connected with the pan and extended outside of the receiving-tank, and means for imparting a centrifugal whirling action to the water in the tank, whereby to precipitate the floatable particles toward the central collecting-pan, as set forth.

3. In an apparatus as described, the combination with the reboiler-tank A, a feed-tube extended centrally into the tank A, and having discharge-outlets at its upper end, a collecting-pan having an offtake extended to the outside of the tank, and means for whirling the water to bring its peripheral surface in a plane above the collecting-pan, as set forth.

4. In an apparatus as described, the combination with the receiving-tank, means within the tank for conveying the inflowing water upwardly, a heat-coil within the tank surrounding the said water-conveying means, a skimmings-collector located within the tank at a point above the water-discharge therein, and a means for whirling the water centrifugally, whereby to concave its upper surface, for the purposes specified.

5. The combination with the tank A, a feed-water supply therefor, a skimmings-collector located in the tank, a means for whirling the water-surface in a plane above the skimmings-collector, whereby to precipitate the oil and other floatable particles into the collector, the perforated pipes G located in the bottom of the tank A, and a valved discharge common to the said pipes, substantially as shown and described.

6. The combination with the tank A, a feed-water supply therefor, a skimmings-collector located in the tank, and means for whirling the water-surface in a plane above the collector, whereby to precipitate the oil and other floatable particles therein, said collector having an offtake discharge outside of the tank A, the perforated pipes G G, located in the lower part of the tank A, said pipes having a valved discharge extended outside of the tank, a steam-supply, and a heat-coil connected therewith located in the bottom of the pan under the perforated pipes G, substantially as shown and for the purposes described.

7. In an apparatus of the character described, the combination with the tank A, means for feeding the condensations into the tank, and discharging the same at a point near the upper end thereof, a skimmings-collector located at the normal water-line in the said tank, said collector having an offtake discharging outside of the tank, means within the tank for whirling the water to precipitate the floatable particles into the skimmings-collector, an offtake communicating with the bottom of the tank, for leading off the cleared water, a valve in said offtake, and a counterbalance device joined with the said valve, said device including a skimmings-collecting bucket, having a valved discharge, all being arranged substantially as shown and for the purposes described.

8. The combination with the tank A, the water-feed thereto, means within the tank for separating the floatable particles, said means including a collector having an offtake discharging outside of the tank; of the clear-water-discharge pipes G, a shiftable valve located in the said discharge-pipes, a counterbalance mechanism connected with the said valve, said mechanism including a bucket D, adapted to receive the skimmings-discharge from the tank A, said bucket having a valved discharge D', and an overflow-pipe connecting the bucket and the said discharge-pipe D', all being arranged substantially as shown and described.

9. The combination with the tank A, means for leading the water therein, and discharging it near the upper end thereof, a skimmings-collector at a point above the water-discharge and in a plane with the normal water-line therein, said skimmings-collector having an offtake discharge outside of the tank, said tank having a discharge for the cleared water, a steam-feed pipe having a lateral K', extending near the bottom of the tank A, said lateral terminating in an ejector extending from the bottom to a point in a plane with the skimmings-collector, said ejector having its discharging-orifices positioned to discharge in a direction tangential to the axis of the tank, for the purposes described.

10. In an apparatus as described, the combination with the reboiler-tank, means therein for separating the oil and other impurities from the water, said means including a discharge-pipe $A^7$ $A^8$, and the clear-water-discharge pipe G, having a gate-valve $g$; of the oscillating lever C, a link connection adjustably joined with the lever and with the valve $g$ at a point to one side of the fulcrum of the lever, a counterpoise at the same end of the lever, a bucket pivotally supported in the opposite end of the lever to receive the discharges from the offtake $A^8$, said bucket having a valved outlet D', and an overflow-pipe $d'$, all being arranged substantially as shown and for the purposes described.

WILLIE HARRY JOHNSON.

Witnesses:
H. L. SMITH,
L. J. HOLMES.